(12) United States Patent
Glimpel et al.

(10) Patent No.: US 11,027,350 B2
(45) Date of Patent: Jun. 8, 2021

(54) THREAD FORMER AND METHOD FOR PRODUCING A THREAD

(71) Applicant: EMUGE-Werk Richard Glimpel GmbH & Co. KG Fabrik für Präzisionswerkzeuge, Lauf an der Pegnitz (DE)

(72) Inventors: Helmut Glimpel, Lauf (DE); Thomas Berschneider, Weigendorf (DE); Jurgen Fenzel, Simmelsdorf (DE)

(73) Assignee: EMUGE-WERK RICHARD GLIMPEL GMBH & CO. KG FABRIK FÜR PraÄZISIONSWERKZEUGE, Lauf an der Pegnitz (DE)

( * ) Notice: Subject to any disclaimer, the term of this patent is extended or adjusted under 35 U.S.C. 154(b) by 123 days.

(21) Appl. No.: 16/463,802

(22) PCT Filed: Nov. 22, 2017

(86) PCT No.: PCT/EP2017/080130
§ 371 (c)(1),
(2) Date: May 23, 2019

(87) PCT Pub. No.: WO2018/096002
PCT Pub. Date: May 31, 2018

(65) Prior Publication Data
US 2019/0283158 A1    Sep. 19, 2019

(30) Foreign Application Priority Data

Nov. 24, 2016 (DE) ...................... 10 2016 122 701.3

(51) Int. Cl.
*B23G 7/02* (2006.01)

(52) U.S. Cl.
CPC ..................... *B23G 7/02* (2013.01)

(58) Field of Classification Search
CPC ....... B23G 7/00; B23G 7/02; B23G 2200/142
See application file for complete search history.

(56) References Cited

U.S. PATENT DOCUMENTS

| | | |
|---|---|---|
| 2,991,491 A | 7/1961 | Wells, Jr. |
| 5,797,710 A * | 8/1998 | Sawabe ................... B23G 7/02 408/215 |

(Continued)

FOREIGN PATENT DOCUMENTS

| | | |
|---|---|---|
| CN | 101626861 A | 1/2010 |
| CN | 101977718 A | 2/2011 |

(Continued)

OTHER PUBLICATIONS

International Search Report dated Mar. 14, 2018 from International Patent Application No. PCT/EP2017/080130 filed Nov. 22, 2017.

(Continued)

*Primary Examiner* — Edward T Tolan
(74) *Attorney, Agent, or Firm* — Workman Nydegger (57) ABSTRACT

A thread former for the chipless production of a thread has a plurality of pressing lands, which are each arranged at predefined separation angles (T) along a shaping curve. Each separation angle (T) is smaller than or equal to a predefined maximum separation angle ($T_{max}$). For nominal thread former diameters (Da) between 6 mm and 20 mm, the maximum separation angle ($T_{max}$) is determined such that the following condition: $T_{max}=\sin^{-1}((a \times ND^y + b \times ND + c) \times 2 \times \pi)$; is met for i) 6≤ND<10 where a=−0.0008, b=0.00705, c=0.1325, y=2; ii) 10≤ND<12 where a=1.7924/(2×π), b=0, c=0, y=−0.408; or iii) 12≤ND≤20 where a=0.751/(2×π), b=0, c=0, y=−0.104; wherein $T_{max}$ is the maximum separation angle and ND is the amount of the nominal thread former diameter (Da) measured in millimeters.

11 Claims, 5 Drawing Sheets

(56) References Cited

U.S. PATENT DOCUMENTS

| | | | | |
|---|---|---|---|---|
| 6,217,267 | B1* | 4/2001 | Sugano | B23G 7/02 408/222 |
| 7,354,350 | B2* | 4/2008 | Hechtle | B23G 7/02 470/204 |
| 8,425,163 | B2* | 4/2013 | Yamamoto | B23G 7/02 408/222 |
| 9,682,435 | B2* | 6/2017 | Yan | B23G 7/02 |
| 9,724,773 | B2* | 8/2017 | Glimpel | B23G 7/02 |
| 2014/0294526 | A1* | 10/2014 | Kopton | B23G 7/00 408/1 R |
| 2019/0291196 | A1* | 9/2019 | Harada | B23G 7/02 |
| 2020/0230727 | A1* | 7/2020 | Harada | B23G 7/02 |

FOREIGN PATENT DOCUMENTS

| | | | |
|---|---|---|---|
| CN | 104114309 A | | 10/2014 |
| DE | 10 2005 019921 A1 | | 3/2006 |
| DE | 10 2005 051174 A1 | | 5/2007 |
| DE | 102012100734 A1 | | 8/2013 |
| EP | 0 767 024 A1 | | 4/1997 |
| JP | S60 153725 U | | 10/1985 |
| JP | H01 153229 A | | 6/1989 |
| JP | 2002 370126 A | | 12/2002 |

OTHER PUBLICATIONS

Search Report received for Chinese Patent Application No. 201780082426.8, dated Jun. 5, 2020, 2 pages.

* cited by examiner

FIG 2

FIG 5

THREAD FORMER AND METHOD FOR PRODUCING A THREAD

CROSS-REFERENCE TO RELATED APPLICATIONS

The present invention is a 35 U.S.C. § 371 U.S. National Stage of PCT Application No. PCT/EP2017/080130, filed on Nov. 22, 2017, which claims priority to German Patent Application No. DE 10 2016 122 701.3, filed Nov. 24, 2016. The entire content of each of the aforementioned patent applications is incorporated herein by reference.

BACKGROUND OF THE INVENTION

1. Field of the Invention

The invention relates to a thread former and to a method for producing a thread former.

2. Background

Along with machining methods, chipless methods and threading tools are also known for producing threads or reworking threads. For example, so-called cold forming taps are included as chipless thread forming tools.

Cold forming taps are threading tools which work axially with respect to their tool axis and comprise, as a rule, a working region which is realized on a tool shank and comprises an arrangement of working surfaces, which are called forming wedges, pressing lands or also tapping teeth, which encircle the tool axis in a helical manner.

The thread is pressed into the workpiece by means of the working surfaces by rotating the tool about the tool axis and feeding axially along the tool axis. Cold forming taps produce the thread therefore as a result of pressure forming or cold forming the workpiece at the respective contact position/surface.

An advantage of threading tools working in a chipless manner, i.e. cold forming taps, compared to threading tools which work by machining is that compaction is achieved in the region of the thread structure as a result of forming the workpiece when producing the thread compared to milled threads, as a result of which a more wear-resistant thread is able to be produced.

The shank of a cold forming tap, as a rule, is realized in a cylindrical manner and is received and held in the clamping chuck of a power tool or a drive by way of its end remote from the workpiece and working region.

The working region is provided with a thread form profile which provides a counter form to the thread to be produced, in particular therefore comprises the identical thread pitch. In the longitudinal section or in the thread profile, the thread-producing tool therefore comprises alternately elevations or teeth and indentations or furrows, which are normally each at the same distance from one another, which means that the pitch of the threads is constant. The cross section of the teeth can have an acute taper radially outward and the head or crest region thereof can be realized in a rounded manner.

In cross sections within the working region, a cold forming tap comprises, as a rule, an almost polygonal outline, the working surfaces (forming wedges, pressing lands or tapping teeth) forming the corner regions of a corresponding polygon. Grooves, in particular coolant and/or lubricant grooves, can be realized, for example, between the corner regions or pressing lands. As an alternative to this or in addition to it, the cold forming tap can comprise channels which extend in the interior of the tool and can be realized in each case for supplying coolant and/or lubricant.

In the case of cold forming taps, it can be provided that the working region of the cold forming tap tapers toward the tool tip, which is positioned remotely from the tool shank, in a, for example, cone-shaped run-up region or tapping region. For example, here the pressing lands can be arranged offset inwardly, in particular with the pressing lands having a largely unchanged form.

As a result of the tapping region, the thread profile, in particular the thread depth, can be produced gradually as a result of increasing radial advancement of the pressing lands. In addition, the penetration of the first pressing lands or tapping teeth in the tapping region into the workpiece surface, e.g. into the inner wall of the bore can be made easier, it being possible to reduce forming forces at the pressing lands.

The increase in the radial advancement or in the radial distance from the tool axis between adjacent or consecutive pressing lands or tapping teeth in the run-up region/taping region is also designated as the forming height.

In a guide or calibration region connecting to the run-up region, the radial advancement or the radial length of the pressing lands or tapping teeth or the outside diameter remains constant. Said region serves for guiding the cold forming tap in the thread produced by forming from the run-up region and, where applicable, for smoothing or calibrating the thread.

To produce a female thread with a cold forming tap, as a rule, first of a bore is produced in the workpiece with an inside diameter that is smaller than the outside diameter of the working region of the cold forming tap. The cold forming tap is then inserted into the bore with the working region at the front at a defined axial feed and defined rotation about the longitudinal axis of the tool shank, i.e. about the tool axis, in the thread forming direction, that is to say clockwise for right-handed thread and anticlockwise for left-handed thread.

When inserting the cold forming tap into the bore, the pressing lands, in particular thread tips and associated forming surfaces of the cold forming tap, are pressed into or onto the surface of the workpiece or of the bore. The material of the workpiece, in this case, is plastically deformed and displaced radially into the indentations or furrows between axially adjacent pressing lands or tapping teeth of the working region of the cold forming tap.

The torque and the friction, in particular the mechanical-tribological load, increases when tapping until all the tapping teeth are engaged.

Once the cold forming tap has been rotated in sufficiently, it is removed from the produced thread by being rotated in the opposite direction, the dynamic friction torque and the mechanical-tribological load decreasing continuously during removal.

When the thread is produced as a result of forming the workpiece, the pressing lands are subject to not insignificant forces, in particular friction forces, which, on the one hand, produce the forming of the workpiece and, on the other hand, as mechanical loads, have a decisive influence on the service life of the pressing lands or tapping teeth. In particular the, in particular radial, advancement and form of the pressing lands or tapping teeth influence not only the forces occurring but also the quality of the thread produced.

DE 11 2009 005 043 T5 discloses a cold forming tap with tapping teeth which have a special structure which is to result in friction torque and heat generation being reduced when the threads are produced.

DE 10 2012 100 734 A1 discloses a cold forming tap where it is proposed to adapt the separation angle between first and second pressing lands along the shaping curve of the working region to improve the forming behavior.

BRIEF SUMMARY OF THE INVENTION

Proceeding from here, it is an object of the invention to provide a novel, in particular alternative thread former and a corresponding production method. In particular, a thread former and a corresponding production method are to be provided which enable precise thread forming and/or by way of which, for example, longer service lives compared to conventional thread formers are able to be achieved in the case of thread formers.

Said object is achieved by the features of the independent claims. Designs and variants are produced in particular from the dependent claims and in addition from the following description, in particular from the designs and embodiments described herein.

A thread former (in particular: cold forming tap), i.e. a tool for producing a thread, which is realized and set up for producing a thread in a rotatory-translatory manner, is provided according to a design of the invention.

The concept of producing a thread is to be understood, in this case, in particular, both as new production of a thread and as reworking an existing thread in or on a workpiece.

The term "in a rotatory-translatory manner" is to be understood as during production of the thread, the thread former being rotated (rotatory part) about the longitudinal axis thereof (in particular: tool axis, rotational axis) and at the same time being moved (translatory part) in the direction, i.e. parallel, to the longitudinal axis.

Chipless production of a thread by means of a thread former or cold forming tap is to be understood in particular as the thread being produced in or on a workpiece substantially as a result of forming the material on the workpiece, in particular cold forming.

Threads produced by forming comprise, as already explained, compared to threads produced by machining, the advantage of improved strengths being able to be achieved in the region of the thread teeth/tapping teeth as a result of improved fiber progression in the workpiece material.

The proposed thread former includes a, i.e. at least one, in particular one or more than one, thread forming portion with a plurality of pressing lands (in particular: working surfaces, forming wedges, tapping teeth).

The pressing lands can be realized in particular, with reference to the longitudinal axis of the thread former, as radially outwardly projecting (in particular: protruding) lands (in particular: teeth, wedges) for producing the thread and/or for reworking a/the thread.

The pressing lands can be realized, in particular, in such a manner that as a result of pressing in the pressing lands, the workpiece is able to be formed on the or in the respective surfaces and/or contact region and that a thread, which is defined substantially by the structure of the pressing lands and the indentations (in particular: furrows) located in between, is able to be realized.

The pressing lands are arranged in designs of the invention in each case at predefined separation angles, which are defined between adjacent pressing lands, along a shaping curve which encircles the tool axis (in particular: rotational axis, longitudinal axis), in particular in a substantially helical manner. A helical shaping curve can be produced, in particular, from the respective pitch of the thread to be produced.

According to the invention, each separation angle between pressing lands that are adjacent along the shaping curve is smaller than or equal to a predefined maximum separation angle.

For nominal thread former diameters between 6 mm and 20 mm, the maximum separation angle in an embodiment of the invention is determined such that the following condition:

$$T_{max} = \sin^{-1}((a \times ND^y + b \times ND + c) \times 2 \times \pi);$$

is met for $6 \leq ND < 10$ where $a=-0.0008$, $b=0.00705$, $c=0.1325$,
$y=2$;                                                                                               i)

$10 \leq ND < 12$ where $a=1.7924/(2 \times \pi)$, $b=0$, $c=0$,
$y=-0.408$; or                                                                                       ii)

$12 \leq ND \leq 20$ where $a=0.751/(2 \times \pi)$, $b=0$, $c=0$,
$y=-0.104$;                                                                                          iii)

wherein $T_{max}$ is the maximum separation angle and ND is the amount of the nominal thread former diameter measured in millimeters. In the above relationship, the symbol "×" corresponds to mathematical multiplication.

The nominal thread former diameter is to be understood, in particular, as the nominal diameter of the thread former without consideration of or independently of possibly present oversizing or undersizing which is provided substantially by the nominal diameter of the guide region (in particular: calibrating region) of the thread former which connects to a run-up region (in particular tapping region) which is present if applicable. The nominal diameter, i.e. nominal thread former diameter, is to be understood, in particular, as the smallest admissible outside diameter of an associated female thread.

The separation angle is to be understood, in particular, as the intermediate angle which is defined with reference to the axial projection and by the center planes of two pressing lands that are consecutive along the shaping curve. In particular, the separation angle is to be understood as the intermediate angle which is measured with reference to the tool axis in the direction of the shaping curve or in the circumferential direction, between pressing lands adjacent along the shaping curve or in the circumferential direction. In this respect, the term separation angle corresponds to the understanding that is usual in the art.

In particular in the case of thread formers within the specified nominal diameter ranges according to i) to iii), the pressing lands of which are arranged corresponding to the given relationship, it has been shown that a service life that is greatly improved compared to thread formers with larger separation angles is able to be achieved, in particular with comparable or even improved thread quality.

For example, in field trials and investigations it has been shown that thread formers realized corresponding to the invention advantageously comprise an extended service life which is able to be increased by a factor of between 1.5 and 2.0 compared to conventional thread formers.

The separation angles determined according to the specified relationship are generally smaller than the separation angles disclosed in the prior art, which means, in particular, that the number of pressing lands arranged along the shaping curve over a full revolution is greater than in the case of thread formers according to the prior art.

In particular, it is a realization of the invention that the maximum admissible distance produced from the specified relationship, in particular the distance between centers, between the pressing lands and, associated therewith, the number of pressing lands along the shaping curve, can have a considerable influence on the service life. In this respect, it is a realization of the invention that the service life and/or thread quality/thread strength can be achieved by a reduction in the maximum separation angle, or by an increase in the number of pressing lands compared to conventional thread formers, the specified relationship for the maximum admissible separation angle having been proven as particularly advantageous.

As a result of an arrangement of the pressing lands corresponding to the above relationship, for example with a smaller distance between circumferences or a smaller separation angle than comparable thread formers in the prior art, a clear increase in the length of service lives can be achieved, even when, increased friction and, associated therewith, increased torque, brought about as a result of the increase in the number of pressing lands, occur during the production of a thread. With a smaller separation angle, it is possible to reduce spring-back of the plastic part of the thread to be formed during the production of a thread. Associated therewith, minimum loads can be produced for the individual forming teeth, for example on account of the shortened distance between circumferences between the consecutive pressing lands, in particular in the forming cone region of the thread former.

A method for producing a thread in or on a workpiece is provided in designs of the invention. The proposed method includes at least the following steps:
provide the workpiece;
provide a thread former realized according to a design of the invention described herein; and
produce the thread by simultaneously rotating and moving the thread former in an axial-translatory manner, wherein the thread former is moved at a predefined rotational speed and at a predefined axial feed speed.

For advantages and advantageous effects of the method reference is made to the statements regarding the thread former which are to apply correspondingly here.

Further designs of the invention, which are to apply to both the thread former and to a corresponding method, are described below, in particular irrespective of whether the corresponding features of the designs are described in conjunction with a thread former or with a method for producing thread.

It can be provided in designs that each of the separation angles is chosen additionally in such a manner that the number of pressing lands of the pressing lands that are present consecutively along the shaping curve for each revolution along the shaping curve comprises an integral value, in particular an uneven value.

In particular, the separation angles can be chosen in designs in such a manner that, on the one hand, the separation angles are smaller than the maximum separation angle, and that, on the other hand, an integral, in particular uneven, number of pressing lands is present per revolution along the shaping curve of the thread forming portion. In particular when using an uneven number of pressing lands, advantageously long service lives can be achieved for a correspondingly realized thread former. In designs, the separation angles can be chosen in such a manner that the number of pressing lands of the pressing lands that are consecutive along the shaping curve for nominal thread diameters where ND≥8 or ND>8 is given by an uneven value.

It can be provided in designs that the maximum separation angle and/or the separation angles is/are determined in such a manner that the number of pressing lands for at least one, as an option for each, revolution along the shaping curve (9) for nominal thread former diameters (Da) between 6 mm and less than 8 mm is precisely 6, and that the number of pressing lands for nominal thread former diameters (Da) between 8 mm and less than 10 mm is precisely 7.

The separation angles can be chosen, for example, in such a manner that they comprise substantially the same value for all adjacent pressing lands.

In variants, the separation angles can be chosen in such a manner that they are different for pressing lands that are consecutive along the shaping curve, in particular corresponding to a predefined pattern or to a regulation that has been predefined in each case. For example, the separation angles can be repeated in the circumferential direction at a predefined periodicity.

In further designs, the separation angles can be chosen in such a manner that the sum of the separation angles between a number of pressing lands predefined in each case along the shaping curve produces a round angle, i.e. 360°.

In designs, in particular in the latter case, it can be provided that the separation angles between adjacent pressing lands maintaining the relationship proposed herein for the maximum separation angle are chosen in such a manner that when, viewed in axial projection of the thread former, multiple groups of pressing lands are arranged one behind another, in particular congruently one behind another.

In designs, a respective group of pressing lands can realize a pressing web which extends in the axial direction, adjacent pressing webs being able to be separated from one another by intermediate grooves, in particular for coolant and/or lubricant.

In particular, with the pressing lands of a group arranged congruently in axial projection, pressing webs or grooves which extend parallel to the longitudinal axis of the thread former can be obtained. In the case of designs where the arrangement is not congruent, groups of pressing webs where the progression of the pressing lands or the progression of the grooves follows a helical path or curve can be obtained.

It can be provided in designs that the separation angle, i.e. the separation angles between adjacent pressing lands, is/are determined in such a manner that the number of pressing lands of the pressing lands present consecutively along the shaping curve for each revolution along the shaping curve for nominal diameters between 10 mm and less than 12 mm is at least 9 (in words: nine), in particular precisely 9 (in words: nine), and that the number of pressing lands for nominal diameters of 12 mm or more than 12 mm, preferably for nominal diameters between 12 mm and 20 mm, is at least 11 (in words: eleven), in particular precisely 11 (in words: eleven).

In particular, in designs the separation angles can be chosen in such a manner that in the circumferential direction with nominal diameters of ≥10 mm and <12 mm precisely 9 (in words: nine) pressing webs are present, and that with nominal diameters of ≥12 and <20 mm precisely 11 (in words: eleven) pressing webs are present.

Particularly advantageously long service lives are produced for the named nominal diameters for the specified numbers of pressing lands.

It can be provided in further embodiments of the invention that at least one flank, which is oriented in the direction of the longitudinal axis of the thread former, in particular oriented parallel to the longitudinal axis with a directional component, of at least one, as an option each, pressing land comprises in each case a first and a second part flank surface.

The first part flank surface can be, for example, a tapping surface of the pressing land, i.e. a forming surface which engages in the material of the workpiece actively at least in part during the production of a thread.

The second part flank surface can be, for example, a free tapping surface which is connected downstream of the tapping surface during the production of the thread, i.e. follows the tapping surface which leads to the forming process.

The part flank surfaces can be realized, for example, on the flanks of the pressing lands oriented toward the thread former tip. Corresponding part flank surfaces can also be present, however, on both sides of the pressing lands in the longitudinal direction.

The part flank surfaces can be realized (in particular: formed and/or ground) in embodiments of the invention, which are also claimable independently, in such a manner that they, or planes that are parallel to the part flank surfaces of a pressing land, intersect along a, in a preferred manner along simply one, line of contact (in particular: cutting line, cutting edge) which extends outward from the core diameter of the thread former at an angle that differs to zero, in a preferred manner at an obtuse angle.

In designs the part flank surfaces can be realized in such a manner that the line of contact extends substantially radially outward with reference to the longitudinal axis of the thread former. For example, the part flank surfaces can be realized in such a manner that line of contact in axial projection extends outward substantially parallel to the radial direction with reference to the longitudinal axis of the thread former.

The core diameter of the thread former is to be understood, in particular, as the diameter measured at the thread former in the indentation bottom of the indentations realized between the pressing lands. The core diameter is produced, in particular, from the outside diameter less the radial height/length of the respective pressing land.

Where the pressing lands are correspondingly designed, they can comprise a substantially synclastic form which points radially outward.

In particular in the case of a synclastic form but also in other embodiments, in further embodiments of the invention the pressing land can comprise a crest point or crest region which can be defined as a radially outermost point or region. The line of contact (in particular: contact edge, cutting line, cutting edge) can extend, in this case, and in further embodiments of the invention through the crest point of the pressing land, or substantially centrally or centered through a corresponding crest region. For example, the line of contact, when viewed in radial projection can extend transversely, in particular perpendicularly, to the crest curve of the pressing land which extends along the shaping curve through the crest point or the center of the crest region.

The line of contact results, in particular, from the, or is determined by the, grinding disk kinematics used when producing the thread former, and/or by the tapping angle or free tapping angle desired in each case at the thread former. The shaping curve or crest curve can be determined, in particular, in such a manner that a straight line of contact is produced or imaged from the core diameter up to at least half the pressing land.

It can be provided in designs that the part flank surfaces are realized in such a manner that, and touch (in particular: cut) one another in the line of contact in such a manner that at a predefined radius, the respective pressing land comprises a maximum thickness measured at the line of contact in cutting planes perpendicular to the shaping line.

In particular in the case of thread formers where, in addition to the condition for the maximum separation angle, the part flank surfaces are realized in such a manner that a line of contact is realized according to one of the described designs, improved stability simultaneously with precise thread structure has been able to be determined.

In particular, it has been shown that a choice, as proposed herein, of the number of pressing lands present per revolution, in particular of the proposed number of pressing webs, in dependence on the nominal diameter, in combination with the flank structure described according to one of the preceding designs (in particular: realizing the flanks from part flank surfaces) can achieve stability which is improved compared to conventional thread formers.

It can be provided in designs that pressing lands, in particular that each of the pressing lands, comprise/comprises a thread former tip which projects radially outward with reference to the longitudinal axis (in particular: rotational axis) of the thread former. The thread former tip can be, for example, the crest point or crest region described further above.

An outwardly protruding thread former tip is to be understood, in particular, as a portion of the thread former which protrudes outward and tapers to a tip or in the manner of a tip. For advantages and advantageous effects of such designs reference is made to the above statements in conjunction with a crest point which turns outward and is used correspondingly.

In designs and variants, it can be provided that the pressing land, in particular each of the pressing lands, is/are realized asymmetrically with reference to a center plane which extends through the thread former tip and parallel to the shaping curve.

With the pressing lands designed in an asymmetric manner, it is possible to achieve, in particular, further improvement in the stability of the thread former. For example, it can be advantageous when the integral of the radial heights of the pressing land along the shaping curve from one end to the tip of the thread former, in particular along the tapping edge, is smaller than the integral of the radial height of the pressing land along the shaping curve from the tip of the thread former to the other end of the pressing land, in particular along the free tapping edge of the pressing land.

In particular, in the case of designs with a thread former tip as described beforehand, it can be of further advantage for the line of contact to extend through the thread former tip, in particular, for instance, through the apex of the thread former tip, for example in such a manner that the line of contact in axial projection shows an approximately radial progression parallel to the longitudinal axis of the thread former. In particular, such geometries of the pressing lands can contribute to threads being able to be produced with sufficient strength and stability as a result of corresponding forming processes, and with the thread formers correspondingly realized, it is possible to achieve advantageously long service lives at the same time.

In designs it can be provided that the pressing land, in particular each of the pressing lands, in particular each of the pressing lands present in the run-up region (in particular: tapping region) and/or each of the pressing lands present in the guide region (in particular: calibration region), comprises a tapping edge, which points radially outward and is oriented in particular in the thread forming direction, and a free tapping edge which points radially outward and is oriented in particular in opposition to the thread forming direction.

A tapping edge is to be understood, in particular, as an edge (in particular: line, contour) which points radially outward with reference to the longitudinal axis and is oriented in the thread forming direction (in particular: thread forming rotational direction) of the thread former and is actively advanced into the material during the production of the thread. Correspondingly, a free tapping edge is to be understood, in particular, as an edge (in particular: line, contour) which points radially outward with reference to the longitudinal axis and is oriented in opposition to the thread forming direction (in particular: thread forming rotational direction) of the thread former, the free tapping edge having to be realized in such a manner that no additional advancement into the material is effected compared to the tapping edge.

The term tapping region is to be understood, as already mentioned in the introduction, as a region that is realized in the region of the tool tip of the thread former remote from the tool shank, in which the pressing lands show an increase in radial advancement or in the radial distance from the tool axis between adjacent or consecutive pressing lands or tapping teeth. As already mentioned, the increase in the advancement is also designated as the forming height.

In addition, the guide region or calibration region is to be understood as a zone which connects to the tapping region, in which at least no increase in radial advancement is effected and the advancement remains constant.

In designs of the invention, in particular with correspondingly designed tapping edges or free tapping edges, it can be provided that a tapping angle, which is realized (in particular: defined) by the tapping edge with reference to a predefined measuring depth, is greater than a free tapping angle which is realized (in particular: defined) by the free tapping edge at the predefined measuring depth.

The term measuring depth is to be understood, in this case, as a corresponding measurement of the tapping angle or of the free tapping angle being carried out at the radial height of a (local) outside diameter of the thread former reduced by the measuring depth.

For determining the tapping angle or the free tapping angle, in axial projection, or with reference to the center plane of the pressing land which extends through the tapping edge or free tapping edge, a tangent is placed onto the tapping edge or free tapping edge at the point of intersection of the tapping edge or the free tapping edge with the measuring depth circle. The tapping angle or free tapping angle is then the amount of the angle, which is realized between the corresponding tangent and a reference tangent at the named intersection point on the measuring depth circle, <90 degrees.

In other words, the tapping angle or the free tapping angle is the amount of the tilt angle, about which the tangent to the tapping edge or free tapping edge has to be tilted at the intersection point between tapping edge or free tapping edge and measuring depth circle, <90 degrees in order to move it to coincide with the reference tangent placed at the intersection point on the measuring depth circle.

With the specified ranges for tapping angle and free tapping angle, it is possible, in particular, to achieve low-wear operation that is linked to comparatively long service lives.

In designs of the invention where at least one flank of a pressing land includes two part flank surfaces, it can be provided that for nominal thread former diameters, i.e. for nominal diameters of the thread portion on the thread former, of between 6 mm and less than 10 mm, the separation angle (in particular: the actual separation angle, or the effectively present separation angle) is determined in such a manner that the number of pressing lands for at least one, as an option for each, revolution along the shaping curve for nominal diameters between 6 mm and less than 8 mm is precisely 6 (in words: six), and that the number of pressing lands for nominal diameters between 8 mm and less than 10 mm is precisely 7 (in words: seven). In other words, in the case of corresponding designs for nominal diameters between 6 mm and less than 8 mm, precisely six pressing lands can be present per revolution, in particular for arbitrary revolutions about the longitudinal axis along the shaping curve, and for nominal diameters between 8 mm and less than 10 mm precisely seven pressing lands can be present per revolution, in particular for arbitrary revolutions about the longitudinal axis along the shaping curve.

In particular, the combination of the named number of pressing lands with corresponding part flank surfaces has proven advantageous with regard to the service life and achievable thread quality.

It can be provided in designs that the pressing lands are arranged in groups to form multiple pressing webs. Each pressing web can extend in further designs substantially parallel to the longitudinal axis (in particular: rotational axis) of the thread former or helically to the longitudinal axis (in particular: rotational axis) of the thread former.

It is, in particular, possible in designs for pressing lands which are placed (in particular: arranged) one behind another along the shaping curve to be arranged parallel to the longitudinal axis (in particular: rotational axis) at one time or multiple times the thread pitch of the thread former.

It can be provided in designs that the surfaces of the pressing lands are smoothed at least in part as a result of a polishing treatment. The polishing treatment can be, for example, polishing with diamond dust or the polishing treatment can include a corresponding polishing step with diamond dust.

BRIEF DESCRIPTION OF THE DRAWINGS

The invention is explained in more detail below, in particular also with regard to further features and advantages, by way of the description of exemplary embodiments as examples and with reference to the accompanying drawings, in which.

Parts and components that correspond with one another in FIG. 1 to FIG. 5 are designated with the same reference symbols.

DETAILED DESCRIPTION OF PREFERRED EMBODIMENTS

Figure 1:
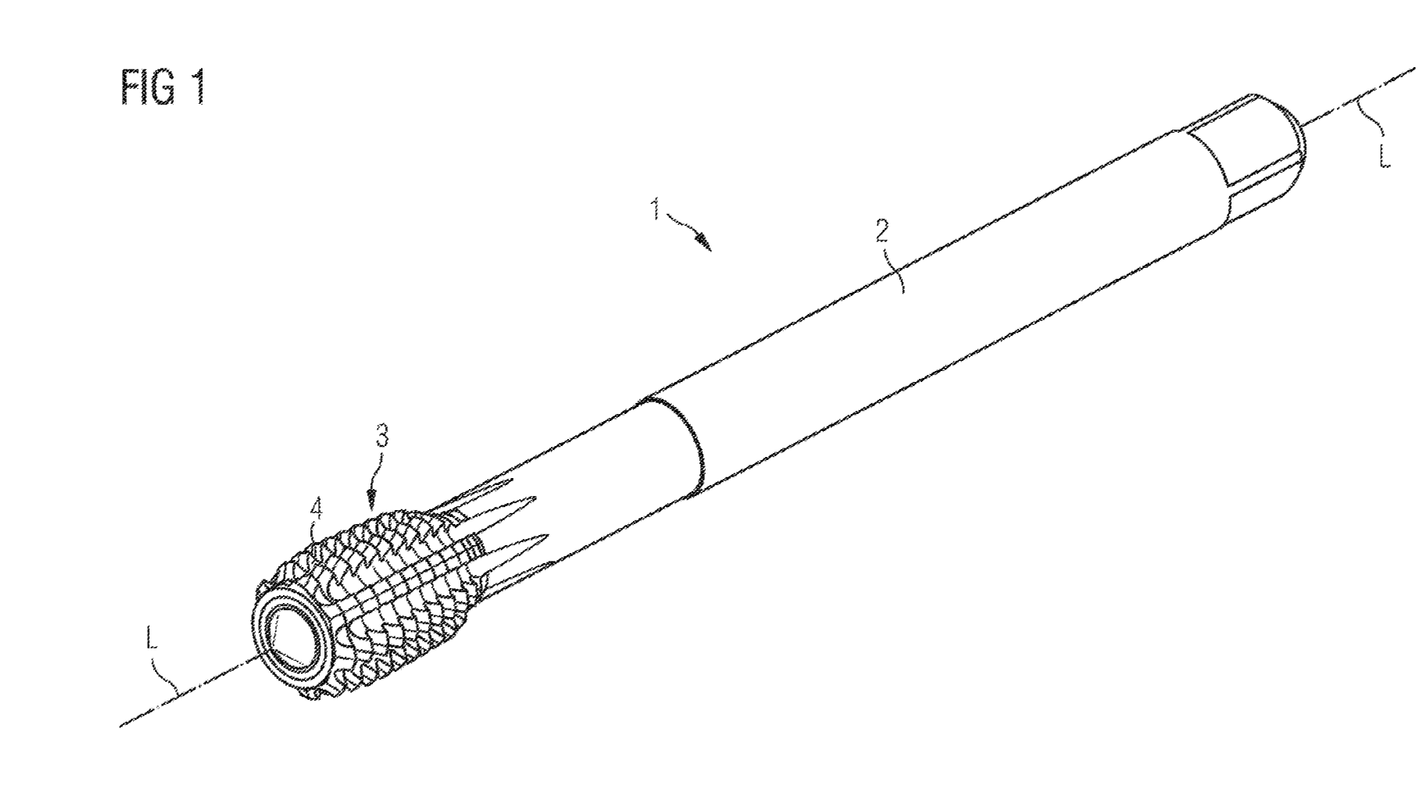
FIG. 1 shows a perspective view of a thread former.

FIG. 1 shows a perspective view of a thread former 1 which is realized for the chipless production of a thread, for example of a female thread, on or in a workpiece, for example produced from one of the materials named further above.

The thread former 1 includes a tool shank 2 for clamping in a motor-driven chuck (not shown), on the one end of which thread former is realized in a working region that is realized in the form of a thread former head 3.

The thread former head 3 includes a plurality of pressing lands 4 which are arranged in a helical manner around the longitudinal axis L (in particular: tool axis, rotational axis), the helical progression of the pressing lands 4, which among other things defines the thread former profile of the thread former 1, corresponds to the thread pitch of the thread that is producible with the thread former head 3. The pressing lands 4 are arranged substantially in such a manner that the center plane thereof is angled corresponding to the pitch of the thread, extends transversely to the longitudinal axis L and is aligned substantially parallel to the helical progression.

Figure 2:
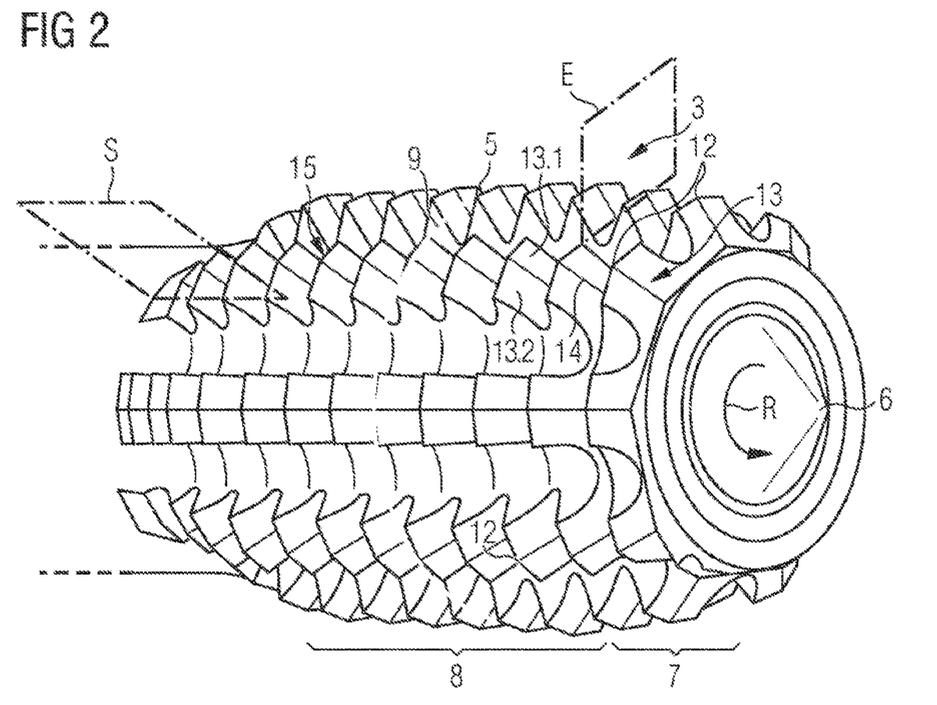
FIG. 2 shows an enlarged view of the thread former head of the thread former.

As can also be seen in particular from FIG. 2, which shows an enlarged view of the thread former head 3 of the thread former 1, the thread former head 3 includes in the thread profile elevations and indentation or furrows which are formed alternately by the pressing lands 4 and are arranged and aligned substantially parallel to the helical progression. The pressing lands 4 and respective corresponding indentations, when viewed in the direction of the longitudinal axis L, are normally, and in the exemplary embodiment shown, at the same distance to one another, which means that the pitch of the threads is constant.

The pressing lands 4 of the exemplary embodiment shown as an example taper radially outward in the cross section of the center plane, said pressing lands being able to be realized in a rounded manner in the radially outermost region, in particular in the head or crest region 5 thereof.

In the case of the cold forming tap 1 shown in the figures, it is provided that the working region, i.e. the thread former head 3, is tapered toward the tool tip 6, which is placed remotely from the tool shank 2, in a cone-shaped tapping region 7, wherein the pressing lands 4 are arranged gradually offset inwardly in the tapping region 7 with a largely unchanged overall form.

As a result of the tapping region 7, a corresponding thread profile is gradually produced as a result of the increasing radial advancement of the pressing lands 4, and in addition penetration of the pressing lands 4 into the workpiece surface, e.g. the inner wall of a corresponding bore, for producing a female thread is made easier, it being possible to reduce the forming forces working at the pressing lands 4 overall.

In the guide or calibration region 8 which connects to the run-up region 7, the radial advancement (in particular: the radial length) of the pressing lands 4 remains substantially constant, said region serving for guiding the cold forming tap in a thread produced by the run-up region as a result of forming, and where applicable for smoothing or calibrating the thread. Toward the end of the tool shank 2 the guide or calibration region 8 can merge into a region which decreases in a cone-shaped manner, in which the radial length of the pressing lands 4 decreases up to the level of the tool shaft.

The increase in the radial advancement between adjacent or consecutive pressing lands 4 in the run-up region/tapping region is also designated as the forming height.

Figure 3:
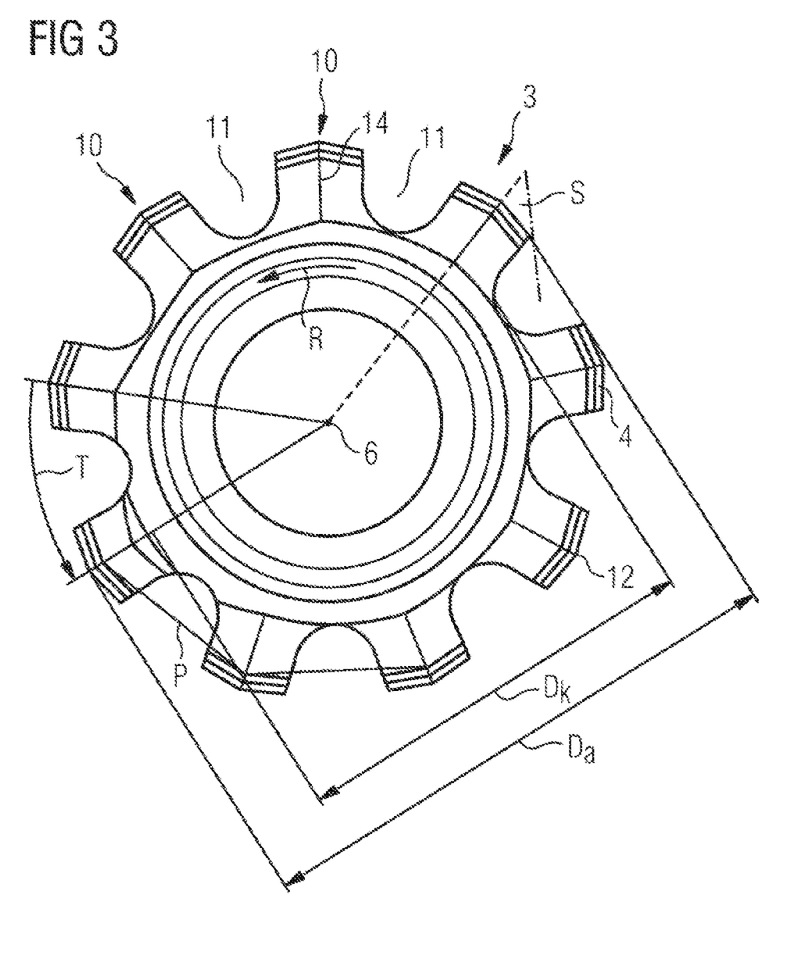
FIG. 3 shows a top view of the thread former head looking in the direction toward the thread former tip.

For producing a female thread with a cold forming tap 1, as a rule a bore is first of all produced in the workpiece, which bore has an inside diameter that is smaller than the outside diameter Da, i.e. nominal diameter Da, of the cold forming tap 1 (see FIG. 3 which shows a top view of the thread former head looking toward the direction of the thread forming tip 6).

The cold forming tap 1 is then introduced into the produced bore with the tool tip at the front at a defined axial feed and defined rotation about the longitudinal axis L in the thread forming direction R.

In this case, the pressing lands 4 and/or associated forming surfaces, such as, for example, axially aligned flanks of the pressing lands 4 which will be explained in more detail further below, are pressed into the surface of the bore so that the thread is produced as a result of material forming, in particular cold forming.

The material of the workpiece, as already mentioned, is, in this case, plastically deformed and displaced radially into the indentations between the pressing lands 4 of the thread former head 3.

The torque increases when tapping until all of the pressing lands 4 are engaged. Once the cold forming tap 1 has been sufficiently rotated in, it is rotated out of the produced thread by rotating in the opposite direction, the sliding friction torque continually decreasing as it is rotated out.

When the thread is produced as a result of forming the workpiece, not insignificant forces occur at the pressing lands 4, in particular friction forces which, on the one hand, influence the forming of the workpiece and, on the other hand, as mechanical stresses, have a decisive influence on the service life of the pressing lands 4. In particular, the radial advancement and form of the pressing lands 4 influence not only the forces occurring but also the quality and strength of the produced thread.

In the case of the thread former according to the invention, the pressing lands 4, as shown in FIG. 1 to FIG. 4, can be arranged in such a manner along the shaping curve 9, which is defined by the pressing lands 4 and extends helically about the longitudinal axis L, that the pressing lands 4 are arranged in groups to form multiple pressing webs 10 (see FIG. 3).

Each pressing web 10 of the exemplary embodiment shown as an example extends substantially parallel to the longitudinal axis L. However, other arrangements of the pressing lands 4 are also possible, for example in such a manner that the pressing webs 10 extend helically with respect to the longitudinal axis L, or that no defined pressing webs 10 are realized at least in portions along the longitudinal axis L, which can be the case, for example, with varying distances between pressing lands 4 in the direction of the shaping curve 9.

The ordered arrangement of the pressing lands 4 into groups to form multiple pressing webs 10 produces grooves 11, which can be used, for example, for the purpose of supplying lubricant and/or coolant, between the pressing webs 10 adjacent in the circumferential direction.

Further lubricant and/or coolant channels (not shown) can be realized, for example, in the interior of the tool shank 2 and of the thread former head 3, and open out, for example, into the region of the tool tip 6.

The thread former 1 shown in FIG. 1 to FIG. 4 is a thread former 1 with a nominal diameter Da, i.e. an outside diameter Da, of 10 mm. In total, the thread former 1 shown comprises nine pressing lands 4, or pressing webs 10, per revolution about the longitudinal axis L, i.e. the tool axis L. In particular, such a realization and arrangement of the pressing lands 4 has proved advantageous with regard to low wear and a long service life with at the same time a high degree of thread quality and thread strength.

In particular, the thread former 1 shown in FIG. 1 to FIG. 4 is realized in such a manner that the pressing lands 4 are arranged in each case at a predefined separation angle T (see FIG. 3) with respect to one another along the shaping curve 9, which encircles the tool axis L, i.e. longitudinal axis L, in a substantially helical manner.

Corresponding to the underlying invention and to the conclusions underlying the invention regarding wear and thread quality and/or thread strength, each separation angle T between adjacent pressing lands 4 is smaller than or equal to a predefined maximum separation angle $T_{max}$, the maximum separation angle $T_{max}$ being determined such that the following condition:

$$T_{max} = \sin^{-1}((a \times ND^2 + b \times ND + c) \times 2 \times \pi),$$

is met for:

$6 \leq ND < 10$ where $a = -0.0008$, $b = 0.00705$, $c = 0.1325$, $y = 2$;  i)

$10 \leq ND < 12$ where $a = 1.7924/(2 \times \pi)$, $b = 0$, $c = 0$, $y = -0.408$; or  ii)

$12 \leq ND \leq 20$ where $a = 0.751/(2 \times \pi)$, $b = 0$, $c = 0$, $y = -0.104$;  iii)

$T_{max}$ being the maximum separation angle and ND the amount of the nominal thread former diameter measured in millimeters.

In particular, the three regions i), ii), und iii), which can also be claimed independently of one another, are produced from the above relationship.

For the shown thread former 1 where Da=10 mm, a maximum separation angle of approximately 45.76 degrees is produced according to the above relationship. The actual or effective separation angle T of the embodiment shown as an example with a total of nine pressing lands 4, or pressing webs 10, per revolution is 40 degrees and is therefore actually smaller than the maximum separation angle Ta. The actual separation angles can be chosen, in particular, in such a manner that they are smaller than or equal to the maximum separation angle, and the number of pressing lands for each revolution corresponds to an integral, for example uneven, value.

It should be noted that it is not necessary for all separation angles Ta to be identical. Rather, it is also possible for the pressing lands 4 to be arranged along the shaping curve using two or more than two different separation angles Ta.

In the case of thread formers 1 according to the invention with a nominal diameter, i.e. outside diameter Da, of 12 mm, a maximum separation angle $T_{max}$ of approximately 35.45 degrees is produced with the above relationship.

If the arrangement of the pressing lands 4 is chosen in such a manner that the number of pressing lands for each revolution along the shaping curve comprises an integral value, in particular an uneven integral value, which has proved to be particularly advantageous with regard to service life and thread quality, thus at a nominal diameter Da of 12 mm, for example, eleven pressing lands 4 can be provided per revolution, which corresponds to an effective separation angle T of 32.73 degrees which lies below the previously named maximum separation angle $T_{max}$ of 35.45 degrees.

As already mentioned, there are advantages with regard to the service life of the thread former 1 and the service life of the pressing lands 4 for maximum separation angles according to the specified relationship, it being possible to achieve advantageous thread qualities and thread stability in particular at the same time.

In particular, according to acquired knowledge for thread forming within the framework of the invention it has proved particularly advantageous when the separation angle is determined in such a manner that the number of pressing lands of the pressing lands 4 that are present consecutively along the shaping curve 9 for each revolution along the shaping curve 9 for nominal diameters Da between 10 mm and less than 12 mm is at least nine, in particular precisely nine, and that the number of pressing lands for nominal diameters of 12 mm or more than 12 mm, preferably for nominal diameters between 12 mm and 20 mm, is at least eleven, in particular precisely eleven.

Figure 4:
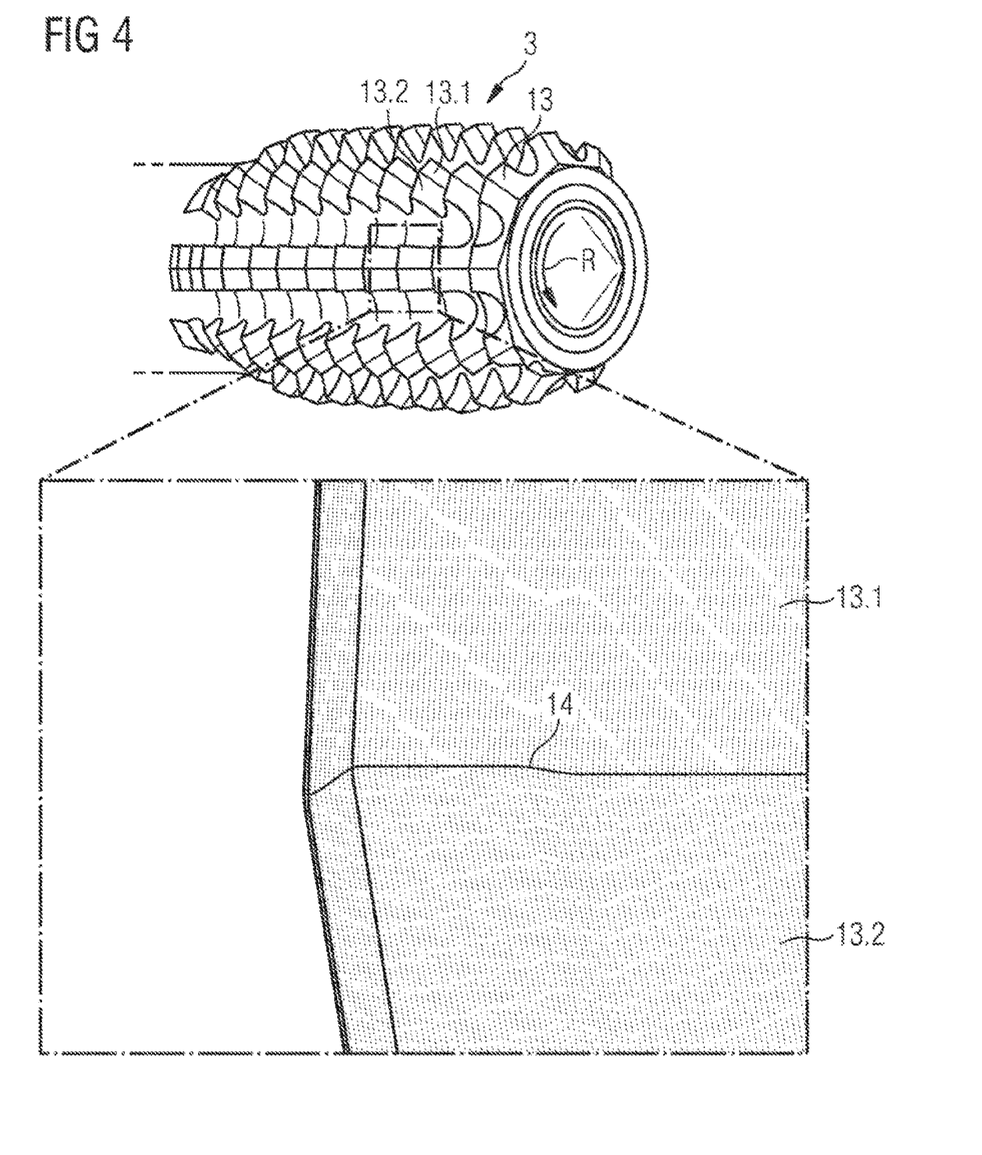
FIG. 4 shows an enlarged representation of a portion of a pressing land of the thread former and FIG. 5 shows a representation of the progression of the tapping and free tapping edges of a pressing land.

As can be seen from FIG. 2, FIG. 3 and in particular from FIG. 4, in which an enlarged representation of a portion of a pressing land 4 of the thread former 1 is shown, the flanks 13 of the pressing lands 4, which are oriented toward the tool tip 6, can each comprise a first part flank surface 13.1 and a second part flank surface 13.2.

In particular, under the specified relationship for the maximum separation angle $T_{max}$ it has proved advantageous with regard to improved service lives and/or thread qualities when the first 13.1 and second part flank surface 13.2 intersect along a line of contact 14 which extends outward from the core diameter Dk of the thread former 1, the part flank surfaces 13 intersecting in a preferred manner at an angle which differs from zero and is in particular obtuse. The latter can mean, for example, that the pressing lands 4 comprise in each case the largest thickness measured in the longitudinal direction in radial sections parallel to the longitudinal axis L on the line of contact 14 in the circumferential direction.

In the example of the thread former 1 in the exemplary embodiment shown, the line of contact 14 extends substantially radially outward with reference to the longitudinal axis L of the thread former 1, which has proved advantageous with regard to reduced wear.

It can be seen in particular from FIG. 3 that the pressing lands 4 can be realized in such a manner that they each realize a thread former tip 12 which protrudes radially outward with reference to the longitudinal axis L of the thread former 1, the line of contact 14 opening out into the thread former tip 12.

The thread former tips 12 provide the regions of the pressing lands 4 with the largest radial advancement when the thread is produced and exposed along with the part flank surfaces 13 and the line of contact 14 to comparatively high friction forces and torques.

The lines of contact 13 beginning approximately at the core diameter Dk open out in each case in a thread former tip 12, edges 15 of the pressing lands 4 which point radially outward comprising a corresponding kink so that the line of contact 14 extends over the edges 15 which point radially outward, which can be seen in particular from FIG. 4.

Consequently, it follows for the pressing land geometry shown that during thread production the radial advancement and radial/axial forming forces increase in opposition to the thread forming direction R toward the line of contact 14 and decrease again from the line of contact. In particular, with the special geometry of the pressing lands 4 and the (in particular: defined, restricted) distance between pressing lands 4, in particular between the thread former tips 12, e.g. in the circumferential direction, given by the maximum separation angle $T_{max}$, advantageous service lives in the case of the thread former 1 and comparatively good thread qualities and strengths can be achieved corresponding to the invention.

As can be seen in particular from FIG. 3, connecting lines, which connect in each case adjacent thread former tips 12 in the circumferential direction, produce a polygon P which is shown in FIG. 3 simply including three thread former tips 12. In the example of the thread former 1 in FIG. 1 to FIG. 4, each polygon observed along the shaping curve 9 for one revolution comprises nine (in numerals: 9) corners.

As can be seen from FIG. 2 and FIG. 3, all pressing lands 4 in the present example are realized in such a manner that said cutting planes S (see FIGS. 3, 5 as an example) which extend through the thread former tip 4 and are perpendicular to the shaping curve 9 are realized asymmetrically.

The thread former 1 of the exemplary embodiment shown is realized especially in such a manner that each of the pressing lands 4 comprises a tapping edge 15.1 which points radially outward, is oriented in the thread forming direction R and connects radially to the first part flank surface 13.1. In this respect the first part flank surface 13.1 can be designated as a tapping surface.

In addition, each of the pressing lands 4 includes a free tapping edge 15.2 which points radially outward, is oriented in opposition to the thread forming direction R and connects radially to the second part flank surface 13.2. In this respect the second part flank surface 13.2 can be designated as a free tapping surface.

Figure 5:
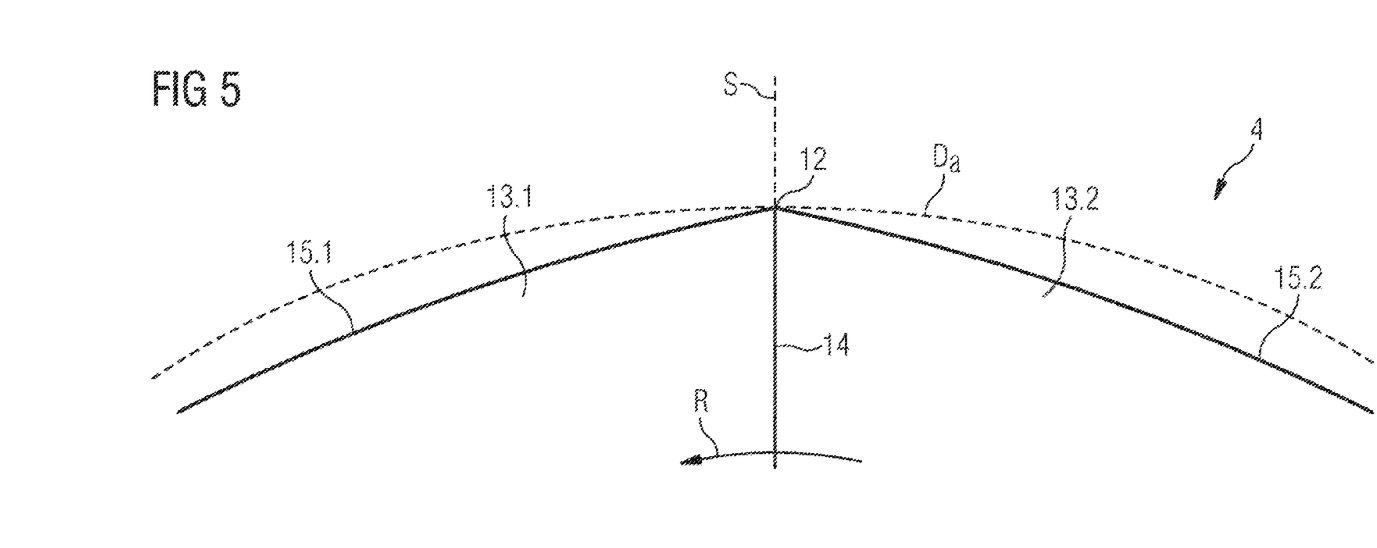

According to a design, as shown in FIG. 5, the pressing land 4 can be realized in such a manner that a tapping angle defined by the tapping edge 15.1 with reference to a predefined measuring depth is greater than a free tapping angle defined by the free tapping edge 15.2 at the predefined measuring depth.

In particular in the case of thread formers 1, which are realized in a manner corresponding to the described line of contact 14 and/or corresponding to the asymmetry relating to tapping edge 15.1 and free tapping edge 15.2, or tapping angle and free tapping angle, designs can be provided for which the maximum separation angle $T_{max}$ is determined as specified for nominal thread diameters Da of between 6 mm and less than 10 mm, and the actual separation angle T is determined in such a manner that precisely six pressing lands 4 are present for at least one, preferably for each, revolution along the shaping curve 9 for nominal diameters of between 6 mm and less than 8 mm, and that precisely seven pressing lands 4 are present for nominal diameters of 8 mm and less than 10 mm. Advantageously service lives and thread qualities and/or thread strengths are also produced for such designs.

In further designs it can be provided that at least the first and second part flank surfaces 13 are smoothed by a polishing treatment, for example with diamond dust. In particular, as a result further advantages with regard to service life and thread quality can be achieved in addition to the special arrangement and geometry of the proposed pressing lands 4.

As can be seen from the described exemplary embodiments, the thread former 1 proposed herein enables the production of a thread, a corresponding method being able to comprise the following steps:

provide the workpiece;
provide a thread former as claimed in one of the designs of the invention proposed herein;
produce the thread by simultaneously rotating and moving the thread former in an axial-translatory manner, wherein the thread former is moved at a predefined rotational speed and a predefined axial speed.

When the thread is produced, the tapping edges 13.1 and the tapping flanks 13.1, i.e. the first part flank surfaces 13.1, and the thread former tips 12 are advanced radially in particular in the tapping region 7, as a result of which the workpiece is formed at the worked surface, in particular cold formed, corresponding to the axial sequence of the pressing lands 4 and indentations between the pressing lands 4 so that a thread which corresponds to the structure of the thread former head 3 is produced.

There is no further advancement in the radial direction in the region of the guide and calibration region 8 (apart from the advancement that occurs, where applicable, on account of the elastic spring-back of the material of the workpiece). As already mentioned, the guide and calibration region 8 is provided for the purpose of guiding the thread former head 3 in the thread produced by the tapping region 7 and/or to rework or calibrate the thread that has already been produced/that exists already.

Overall, it is shown that with the thread former proposed herein for the chipless production of a thread with a plurality of pressing lands 4 which are each arranged at predefined separation angles T along a shaping curve 9, it is possible to in particular achieve advantageous service lives simultaneously with comparatively good thread quality and thread strength.

LIST OF REFERENCES

1 Thread former
2 Tool shank
3 Thread former head
4 Pressing land
5 Crest region
6 Tool tip
7 Tapping region
8 Guide region, calibration region
9 Shaping curve
10 Pressing web
11 Groove
12 Thread former tip
13 Flank
13.1 First part flank surface
13.2 Second part flank surface
14 Line of contact
15 Edge
15.1 Tapping edge
15.2 Free tapping edge
L Longitudinal axis
Da Outside diameter
Dk Core diameter
T Separation angle
Tmax Maximum separation angle
E Center plane
P Polygon
R Thread forming direction
S Cutting plane

We claim:
1. A thread former for the chipless production of a thread, including a thread forming portion with a plurality of pressing lands which are each arranged at predefined separation angles (T) between adjacent pressing lands along a shaping curve, which encircles a tool axis (L), wherein:
each separation angle (T) is smaller than or equal to a predefined maximum separation angle ($T_{max}$);

for nominal thread former diameters (Da) between 6 mm and 20 mm the maximum separation angle ($T_{max}$) is determined such that the following condition:

$$T_{max}=\sin^{-1}((a \times ND^y + b \times ND + c) \times 2 \times \pi) \text{ is met for:}$$

$6 \leq ND < 10$ where $a=-0.0008$, $b=0.00705$, $c=0.1325$, $y=2$;  i)

$10 \leq ND < 12$ where $a=1.7924/(2 \times \pi)$, $b=0$, $c=0$, $y=-0.408$; and  ii)

$12 \leq ND \leq 20$ where $a=0.751/(2 \times \pi)$, $b=0$, $c=0$, $y=-0.104$;  iii)

$T_{max}$ is the maximum separation angle and ND is an amount of the nominal thread former diameter (Da) measured in millimeters; and the separation angle (T) is determined such that: (i) a number of pressing lands for at least one revolution along the shaping curve for nominal thread former diameters (Da) between 6 mm and less than 8 mm is precisely 6, and (ii) the number of pressing lands for nominal thread former diameters (Da) between 8 mm and less than 10 mm is precisely 7.

2. The thread former for the chipless production of a thread, including a thread forming portion with at least one pressing land, wherein:

at least one flank, oriented in a direction of a longitudinal axis (L) of the thread former, of at least one pressing land, comprises in each case a first and a second part flank surface, which intersect along a line of contact which extends outward from a core diameter (Dk) of the thread former at an angle that differs from zero; and the line of contact extends substantially radially outward with reference to the longitudinal axis (L) of the thread former when viewed in axial projection and extends outward substantially parallel to the radial direction.

3. The thread former as claimed in claim 2, wherein:
a line of contact extends through a tip of the thread former; and
the line of contact shows a somewhat radial progression when viewed in axial projection parallel to the longitudinal axis (L) of the thread former.

4. The thread former as claimed in claim 2, wherein:
the shaping curve or crest curve is determined in such a manner that a rectilinear line of contact is produced or imaged from the core diameter up to at least half of the pressing land; and
the part flank surfaces contact one another in the line of contact such that, at a predefined radius, the respective pressing land comprises a maximum thickness at the line of contact when measured in cutting planes perpendicular to the shaping line.

5. The thread former as claimed in claim 1, wherein:
each of the separation angles (T) is chosen additionally in such a manner that the number of pressing lands of the pressing lands present consecutively along the shaping curve comprising an uneven integral value for each revolution along the shaping curve;
the separation angles (T) are chosen such that the number of pressing lands of the pressing lands present consecutively along the shaping curve is given for nominal thread diameters where ND≥8 or ND>8 by an uneven value.

6. The thread former as claimed in claim 5, wherein the separation angle (T) is determined in such a manner that:
the number of pressing lands of the pressing lands present consecutively along the shaping curve for each revolution along the shaping curve for nominal diameters (Da) between 10 mm and less than 12 mm is at least 9; and
the number of pressing lands for nominal diameters (Da) between 12 mm and 20 mm, is at least 11.

7. The thread former as claimed in claim 1, wherein:
the pressing land comprises a thread former tip which projects radially outward with reference to the longitudinal axis (L) of the thread former; and
the pressing land is asymmetric with reference to a center plane (E), which extends through the thread former tip and parallel to the shaping curve.

8. The thread former as claimed in claim 1, wherein:
the pressing land comprises a tapping edge which points radially outward, and a free tapping edge which points radially outward; and
a tapping angle which is defined by the tapping edge is greater with reference to a predefined measuring depth than a free tapping angle which is defined by the free tapping edge at the predefined measuring depth.

9. The thread former as claimed in claim 1, wherein:
the pressing lands are arranged in groups to form multiple pressing webs; and
each pressing web extends substantially parallel to the longitudinal axis (L) or helically to the longitudinal axis (L), and pressing lands which are placed one behind another along the shaping curve are arranged parallel to the longitudinal axis (L) with a thread pitch that is a multiple of the thread pitch of the thread former.

10. The thread former as claimed in claim 1, wherein:
the surfaces of the pressing lands are smoothed at least in part by means of a polishing treatment; and
the polishing treatment includes polishing with diamond dust.

11. A method for producing a thread in or on a workpiece, comprising the following steps:
providing the workpiece;
providing a thread former for the chipless production of a thread, the thread former including a thread forming portion with a plurality of pressing lands which are each arranged at predefined separation angles (T) between adjacent pressing lands along a shaping curve, the shaping curve encircling the tool axis (L), which encircles the tool axis (L), wherein:
each separation angle (T) is smaller than or equal to a predefined maximum separation angle ($T_{max}$);
for nominal thread former diameters (Da) between 6 mm and 20 mm the maximum separation angle ($T_{max}$) is determined such that the following condition:

$$T_{max}=\sin^{-1}((a \times ND^y + b \times ND + c) \times 2 \times \pi) \text{ is met for:}$$

$6 \leq ND < 10$ where $a=-0.0008$, $b=0.00705$, $c=0.1325$, $y=2$;  i)

$10 \leq ND < 12$ where $a=1.7924/(2 \times \pi)$, $b=0$, $c=0$, $y=-0.408$; and  ii)

$12 \leq ND \leq 20$ where $a=0.751/(2 \times \pi)$, $b=0$, $c=0$, $y=-0.104$;  iii)

$T_{max}$ is the maximum separation angle and ND is the amount of the nominal thread former diameter (Da) measured in millimeters;
providing the thread by simultaneously rotating and moving the thread former in an axial-translatory manner;

wherein the thread former is moved at a predefined rotational speed and a predefined axial feed speed.

* * * * *